United States Patent [19]

Karabinis

[11] Patent Number: 4,481,645

[45] Date of Patent: Nov. 6, 1984

[54] LINEAR DISTORTION CANCELLER CIRCUIT

[75] Inventor: Peter D. Karabinis, Atkinson, N.H.

[73] Assignee: AT&T Bell Laboratories, Murray Hill, N.J.

[21] Appl. No.: 454,266

[22] Filed: Dec. 29, 1982

[51] Int. Cl.³ .......................................... H04B 15/00
[52] U.S. Cl. ...................................... 375/58; 375/99; 328/163
[58] Field of Search ...................... 375/34, 50, 78, 58, 375/38, 39, 99; 455/22, 20, 47, 66, 63, 112, 114, 109, 189, 190, 130, 131, 132, 313, 314, 207, 209, 216; 331/37, 38, 39; 332/22, 41, 42; 370/11, 20; 328/162, 163

[56] References Cited

U.S. PATENT DOCUMENTS

| | | | |
|---|---|---|---|
| 3,274,492 | 9/1966 | Van Kessel et al. | 455/109 |
| 3,409,832 | 11/1968 | Van Kessel | 455/112 |
| 3,825,843 | 7/1974 | Felsberg et al. | 328/163 |
| 3,955,050 | 5/1976 | Di Toro | 455/130 |
| 4,016,497 | 4/1977 | Miedema | 328/162 |
| 4,048,559 | 9/1977 | Miedema | 324/57 |
| 4,088,948 | 5/1978 | Miedema | 324/57 |
| 4,088,955 | 5/1978 | Baghdady | 455/303 |
| 4,109,212 | 8/1978 | Donnell et al. | 328/163 |
| 4,122,399 | 10/1978 | Heiter et al. | 330/149 |
| 4,130,811 | 12/1978 | Katz et al. | 332/23 |
| 4,143,322 | 3/1979 | Shimamura | 455/209 |
| 4,310,920 | 1/1982 | Hayes | 455/47 |

OTHER PUBLICATIONS

The Bell System Technical Journal, vol. 60, No. 11, Nov. 1981, pp. 1997–2021.

Primary Examiner—Robert L. Griffin
Assistant Examiner—Stephen Chin
Attorney, Agent, or Firm—David R. Padnes

[57] ABSTRACT

The linear distortion canceller circuit (104, 104-1) obliterates the linear component of any amplitude and/or group delay distortion in a double-sideband, amplitude modulated carrier signal. Pursuant to the present invention, the carrier signal is split into first and second signals. The first signal is multiplied by a mixing signal at twice the carrier signal frequency and the mixed first signal is then added with the second signal. The disclosed apparatus and method can be used in a communications system utilizing QAM modulation.

12 Claims, 2 Drawing Figures

LINEAR DISTORTION CANCELLER CIRCUIT

TECHNICAL FIELD

The present invention relates to a linear distortion canceller circuit for obliterating the linear component of any amplitude and/or group delay distortion in a double-sideband, amplitude modulated carrier signal.

BACKGROUND OF THE INVENTION

Double-sideband, amplitude modulated carrier signals are used in communications systems. The amplitude and/or group delay distortion of such signals after propagation through a transmission channel can, at times, render the received information unintelligible. This is especially true in radio systems wherein the transmission channel is uncontrolled and oftentimes unpredictable.

Distortion can be characterized in the frequency domain as having a linear and a nonlinear component. The linear distortion component varies directly with frequency, while the nonlinear distortion component is a more complex function of frequency which is sometimes not readily definable. Therefore, complete elimination of linear and nonlinear distortion is a difficult task. However, in many systems applications, elimination of only the linear distortion is sufficient to meet system performance objectives.

Prior art techniques to eliminate linear distortion have relied on cancellation and/or equalization techniques. In radio systems, for example, slope equalizers eliminate amplitude slope but do not equalize the group delay distortion. Furthermore, the frequency-dependent gain provided by an amplitude equalizer can result in noise enhancement. In contrast, cancellation does not rely on frequency-dependent amplification to remove the linear distortion and, therefore, does not produce any noise enhancement. However, the problem with available linear distortion cancellers is that they do not operate directly on a double-sideband, amplitude modulated carrier signal. Instead, present linear distortion cancellers operate on the baseband signals generated by demodulating the received carrier signal. When the distortion is severe, the ability to demodulate is impaired which, in turn, affects the operation of the distortion canceller. Accordingly, it would be desirable to provide a linear distortion canceller which can operate directly on a double-sideband, amplitude modulated carrier signal.

SUMMARY OF THE INVENTION

In accordance with the present invention, a double-sideband, amplitude modulated carrier signal is split into first and second signals. The first signal is multiplied with a mixing signal at twice the carrier frequency. The mixed first signal is then combined with the second signal to cancel the linear distortion.

An aspect of the present invention is that it has the ability to separate the quadrature-related carriers of a quadrature amplitude modulated (QAM) signal.

Another aspect of the present invention is that it can be used to eliminate the linear distortion in a QAM signal if each of the amplitude modulated carriers forming the QAM signal is transmitted with a different polarization.

DETAILED DESCRIPTION

Figure 1:
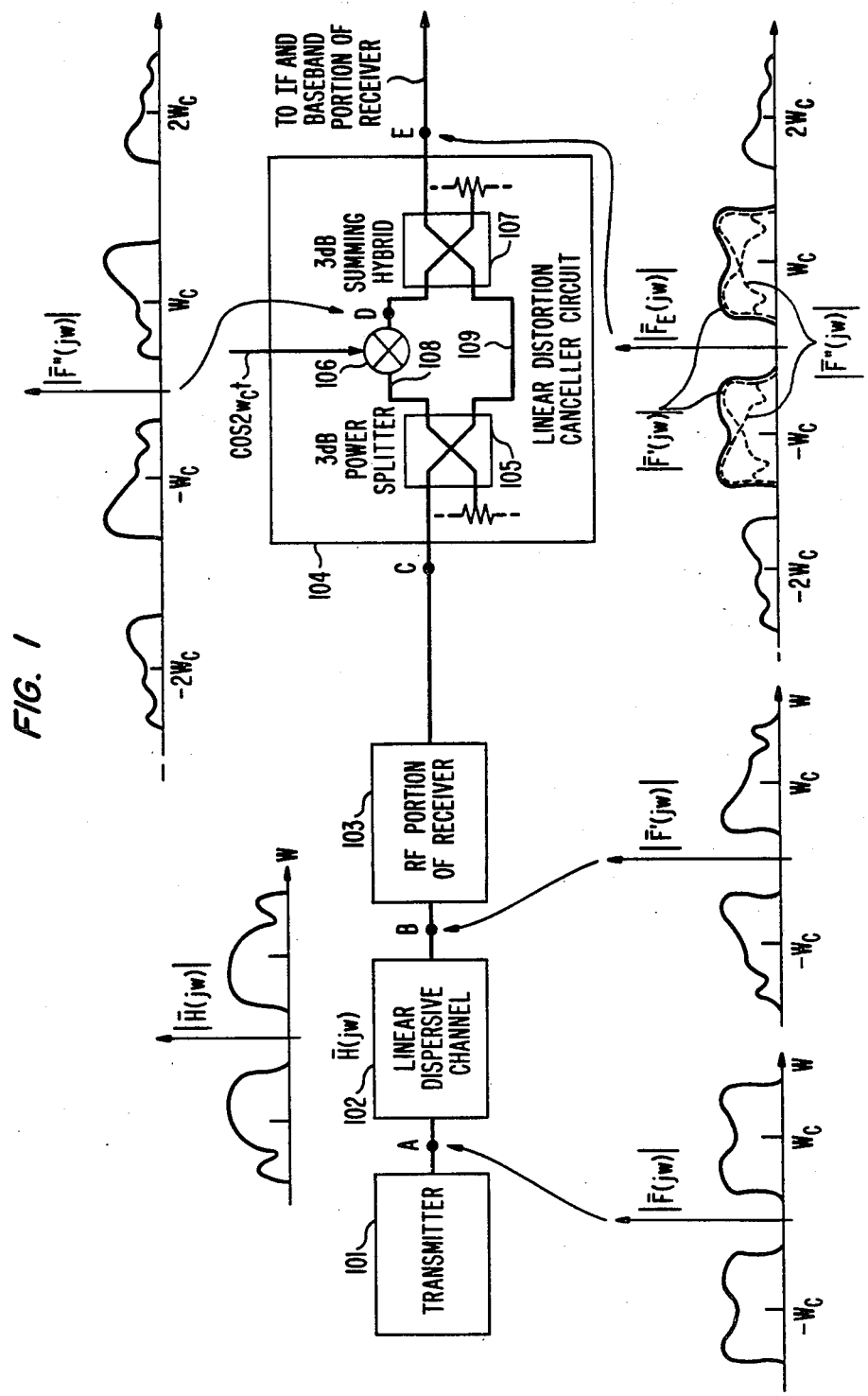
FIG. 1 is a block schematic diagram of a transmission system incorporating apparatus in accordance with the present invention.

FIG. 1 illustrates the operation of a linear distortion canceller circuit, in accordance with the present invention, within a communications system which transmits a double-sideband, amplitude modulated carrier signal. Transmitter 101, in conventional fashion, generates this carrier signal by modulating a sinusoidal carrier of frequency $\omega_c$ with a real, band-limited information signal $m(t)$. Signal $m(t)$ has a Fourier transform $\overline{M}(j\omega)$ which can be expressed as:

$$M(j\omega) = A(\omega)e^{j\phi(\omega)}, \qquad (1)$$

where $A(\omega)$ is the amplitude of each spectral component in $m(t)$ as a function of frequency, and $\phi(\omega)$ is the phase of each spectral component of $m(t)$ as a function of frequency.

We will assume that $A(\omega)$ is equal to zero outside the range $-\pi B \leq \omega \leq \pi B$, where B is the bandwidth of $m(t)$ in Hertz (hz). The double-sideband amplitude modulated signal, designated as $f(t)$, can be written as:

$$f(t) = 2m(t) \cos \omega_c t, \qquad (2)$$

where the spectrum of $f(t)$ is:

$$\overline{F}(j\omega) = \overline{M}(j\omega - j\omega_c) + \overline{M}(j\omega + j\omega_c)$$

or in exponential form as:

$$\overline{F}(j\omega) = A(\omega - \omega_c)e^{j\phi(\omega - \omega_c)} + A(\omega + \omega_c)e^{j\phi(\omega + \omega_c)} \qquad (3)$$

The magnitude of the spectrum $\overline{F}(j\omega)$ as a function of frequency is shown graphically at the output of transmitter 101, which is designated as reference point A in FIG. 1.

$\overline{F}(j\omega)$ is assumed to propagate over a linear dispersive channel 102 having a transfer function $\overline{H}(j\omega)$. $\overline{H}(j\omega)$ can be defined as having a two-sided spectrum comprising component $\overline{H}_R(j\omega)$ on the positive portion of the $\omega$ axis and component $\overline{H}_I(j\omega)$ on the negative portion of the $\omega$ axis; where $$\overline{H}_R(j\omega) = H_{OR}(\omega)e^{jZ_R(\omega)} \text{ for } \omega_c - \pi B \leq \omega \leq \omega_c + \pi B \qquad (4)$$

and $$\overline{H}_I(j\omega) = H_{OI}(\omega)e^{jZ_I(\omega)} \text{ for } -\omega_c - \pi B \leq \omega \leq -\omega_c + \pi B \qquad (5)$$

The terms $H_{OR}(\omega)$ and $H_{OI}(\omega)$ respectively represent the amplitude transfer function of the channel for the spectral components on the positive portion and negative portions of the $\omega$ axis. $Z_R(\omega)$ and $Z_I(\omega)$ respectively represent the phase transfer function of the channel for the spectral components on the positive portion and negative portion of the $\omega$ axis.

An assumed shape for $\overline{H}(j\omega)$, corresponding to a multipath medium, such as air, is shown for channel 102. After propagation through the channel, the signal spectrum at reference point B can be denoted as:

$$\overline{F'}(j\omega) = \overline{H}(j\omega)\overline{F}(j\omega) = \overline{H}_R(j\omega)\overline{M}(j\omega - j\omega_c) + \overline{H}_I(j\omega)\overline{M}(j\omega + j\omega_c), \text{ or} \quad (6)$$

$$\overline{F'}(j\omega) = H_{OR}(\omega)A(\omega - \omega_c)e^{j\Phi(\omega-\omega_c)}e^{jZR(\omega)} + H_{OI}(\omega)A(\omega + \omega_c)e^{j\Phi(\omega+\omega_c)}e^{jZI(\omega)}$$

The signal spectrum $\overline{F'}(j\omega)$ enters a conventional radio frequency (RF) portion 103 of a radio receiver and is then coupled to linear distortion canceller 104. The signal spectrum at reference point C at the input to canceller 104 has substantially the same shape as at reference point B except for some flat gain or attenuation introduced in RF portion 103. This gain or attenuation will be represented by G.

Canceller 104 comprises power splitter 105, mixer 106 and summing hybrid 107. Splitter 105 divides the signal at reference point C into first and second components. Preferably, splitter 105 is a 3dB coupler so that the power levels or equivalently the amplitudes of the first and second components are equal. Mixer 106 multiplies the first component by a sinusoid at twice the transmitted carrier frequency. Such a sinusoid can be represented by the expression $\cos 2\omega_c t$. This mixing produces the spectrum $\overline{F''}(j\omega)$ whose magnitude is shown graphically as a function of frequency at reference point D. As shown, the effect of mixing rotates the spectrum $\overline{F'}(j\omega)$ about the vertical axis and translates an attenuated $\overline{F'}(j\omega)$ to positions symmetrically disposed about $\pm 2\omega_c$. Analytically, $\overline{F''}(j\omega)$ can be expressed as:

$$\overline{F''}(j\omega) = \quad (7)$$
$$\frac{G}{\sqrt{2}} H_{OI}(\omega - 2\omega_c)A(\omega - \omega_c)e^{j\Phi(\omega-\omega_c)}e^{jZI(\omega-2\omega_c)} +$$
$$\frac{G}{\sqrt{2}} H_{OR}(\omega + 2\omega_c)A(\omega + \omega_c)e^{j\Phi(\omega+\omega_c)}e^{jZR(\omega+2\omega_c)}$$

over the frequency range $-\omega_c - \pi B \leq \omega \leq \omega_c + \pi B$. In equation (7) an ideal mixer with zero conversion loss and a 3 dB power splitter are assumed.

Summing hybrid 107 adds the mixed first component and the second component producing the spectrum $\overline{F}_E(j\omega)$ at point E. Preferably, hybrid 107 is a 3 dB coupler so that the added components are weighted equally. The signal at point E, having the linear component of amplitude and group delay distortion cancelled, is then coupled to the IF and baseband portions of the receiver for further signal processing.

The signal $\overline{F}_E(j\omega)$ appearing at point E can be expressed analytically as:

$$\overline{F}_E(j\omega) = \quad (9)$$
$$\frac{G}{2} A(\omega - \omega_c)e^{j\Phi(\omega-\omega_c)}[H_{OI}(\omega - 2\omega_c)e^{jZI(\omega-2\omega_c)} + H_{OR}(\omega)e^{jZR(\omega)}] +$$
$$\frac{G}{2} A(\omega + \omega_c)e^{j\Phi(\omega+\omega_c)}[H_{OR}(\omega + 2\omega_c)e^{jZR(\omega+2\omega_c)} + H_{OI}(\omega)e^{jZI(\omega)}]$$

over the frequency range of $-\omega_c - \pi B \leq \omega \leq \omega_c + \pi B$, or as:

$$\overline{F}_E(j\omega) = \frac{G}{2} \overline{M}(j\omega - j\omega_c)[\overline{H}_I(j\omega - j2\omega_c) + \overline{H}_R(j\omega)] +$$
$$\frac{G}{2} \overline{M}(j\omega + j\omega_c)[\overline{H}_R(j\omega + 2j\omega_c) + \overline{H}_I(j\omega)]$$

In FIG. 1 $\overline{F}_E(j\omega)$ is graphically shown for $-\omega_c - \pi B \leq \omega \leq \omega_c + \pi B$ as the sum of two dotted curves representing the $\overline{F'}(j\omega)$ and $\overline{F''}(j\omega)$ spectrums.

The fact that the linear component of amplitude and group delay distortion has been cancelled can be demonstrated by applying well-known mathematical techniques to equation (9). At the outset, it should be noted that the terms $(G/2)\overline{M}(j\omega - j\omega_c)$ and $(G/2)\overline{M}(j\omega + j\omega_c)$ are each the product of a constant G/2 and the Fourier transform of m(t) shifted in frequency and, therefore, comprise no amplitude or group delay distortion. The bracketed terms, i.e., $[\overline{H}_I(j\omega - 2j\omega_c) + \overline{H}_R(j\omega)]$ or $[\overline{H}_R(j\omega + 2j\omega_c) + \overline{H}_I(j\omega)]$ can be shown to be devoid of linear amplitude distortion by forming the magnitude of either bracketed term and noting the symmetry about $\omega_c$. Similarly, for group delay, defined as the derivative of the phase with respect to frequency (e.g. $d\Phi(\omega)/d\omega$), the absence of any linear component of group delay can be shown by forming this derivative and noting the symmetry about $\omega_c$.

Linear distortion cancellers in accordance with the present invention are also applicable to communications systems in which the linear sum of a pair of amplitude modulated, quadrature-related carrier signals is transmitted. This form of modulation is often referred to as quadrature amplitude modulation (QAM), phase shift keying (PSK) or amplitude and phase shift keying (APSK). Before proceeding further, it should be noted that in this form of modulation each of the two quadrature-related carrier signals is an amplitude modulated signal. Therefore, if each of the two carrier signals is transmitted over a different spatial polarization instead of the sum, a linear distortion canceller for each carrier signal can be used in the receiver to cancel the linear component of amplitude and/or group-delay distortion. Deletion of the summing operation in QAM modulation in the transmitter may, at times, be difficult to accomplish. This is especially true in integrated systems. However, as will be shown below, a pair of linear distortion cancellers can be utilized to resolve the QAM carrier signal into the original quadrature-related components.

First, consider that a distortion-free QAM signal can be expressed in the time domain as:

$$s(t) = i(t) \cos \omega_c t - q(t) \sin \omega_c t, \quad (10)$$

where $$i(t) = \sum_k a_k p(t - kT) \quad (11)$$

and $$q(t) = \sum_k b_k p(t - kT),$$

with
p(t) denoting the pulse shape,
T the symbol period,
$\{a_k\}$ is the "I-rail" data stream which modulates the amplitude of the first of the quadrature-related carriers at frequency $\omega_c$, and {$b_k$} is the "Q-rail" data stream which modulates the amplitude of the second of the quadrature-related carriers at frequency $\omega_c$.

Now, let $\bar{I}(j\omega)$ and $\bar{Q}(j\omega)$ represent the Fourier transforms (the frequency spectra) of i(t) and q(t), respectively, such that:

$$\bar{I}(j\omega) = \int_{-\infty}^{\infty} i(t)e^{-j\omega t}dt \text{ for } -\pi B \leq \omega \leq \pi B \quad (12)$$

$$\bar{I}(j\omega) = 0 \text{ for } \omega > \pi B \text{ and } -\omega < -\pi B$$

and $$\bar{Q}(j\omega) = \int_{-\infty}^{\infty} q(t)e^{-j\omega t}dt \text{ for } -\pi B \leq \omega \leq \pi B \quad (13)$$

$$\bar{Q}(j\omega) = 0 \text{ for } \omega > \pi B \text{ and } -\omega < -\pi B$$

Then, the Fourier transform of s(t) can be expressed as:

$S(j\omega)$=the Fourier transform of [i(t) cos $\omega_c t$] minus the Fourier transform of [q(t) sin $\omega_c t$], (14)

where the Fourier transform of [i(t) cos $\omega_c t$] can be written as:

$$\frac{1}{2}\bar{I}(j\omega - j\omega_c) + \frac{1}{2}\bar{I}(j\omega + j\omega_c) \quad (15)$$

and the Fourier transform of [q(t) sin $\omega_c t$] can be written as:

$$\frac{1}{2}e^{-j\frac{\pi}{2}}\bar{Q}(j\omega - j\omega_c) - \frac{1}{2}e^{-j\frac{\pi}{2}}\bar{Q}(j\omega + j\omega_c). \quad (16)$$

Substituting equations (15) and (16) into equation (14) we have:

$$\bar{S}(j\omega) = \frac{1}{2}\left[\bar{I}(j\omega - j\omega_c) + e^{j\frac{\pi}{2}}\bar{Q}(j\omega - j\omega_c)\right] + \quad (17)$$

$$\frac{1}{2}\left[\bar{I}(j\omega + j\omega_c) + e^{-j\frac{\pi}{2}}\bar{Q}(j\omega + j\omega_c)\right].$$

Therefore, with $\bar{S}(j\omega)$ as an input to the linear distortion canceller circuit, the output spectrum, $\bar{S}_E(j\omega)$, will be:

$$\bar{S}_E(j\omega) = \frac{1}{4}\left[\bar{I}(j\omega - j\omega_c) + e^{-j\frac{\pi}{2}}\bar{Q}(j\omega - j\omega_c)\right] + \quad (18)$$

$$\frac{1}{4}\left[\bar{I}(j\omega - j\omega_c) + e^{j\frac{\pi}{2}}\bar{Q}(j\omega - j\omega_c)\right] +$$

$$\frac{1}{4}\left[\bar{I}(j\omega + j\omega_c) + e^{j\frac{\pi}{2}}\bar{Q}(j\omega + j\omega_c)\right] +$$

$$\frac{1}{4}\left[\bar{I}(j\omega + j\omega_c) + e^{-j\frac{\pi}{2}}\bar{Q}(j\omega + j\omega_c)\right],$$

over the frequency interval $-\omega_c - \pi B \leq \omega \leq \omega_c + \pi B$. In equation (18) the $\bar{Q}$ components are equal in magnitude but are opposite in phase. Therefore, they cancel one another and equation (18) reduces to:

$$\bar{S}_E(j\omega) = \frac{1}{2}\bar{I}(j\omega - j\omega_c) + \frac{1}{2}\bar{I}(j\omega + j\omega_c), \quad (19)$$

which only comprises the spectrum of the I data rail. Similarly, if the cosine input of the mixer in the linear distortion canceller is supplied with $-\cos 2\omega_c t$ instead of $\cos 2\omega_c t$, the output spectrum $\bar{S}_E(j\omega)$ will be:

$$\bar{S}_E(j\omega) = \frac{1}{2}e^{j\frac{\pi}{2}}\bar{Q}(j\omega - j\omega_c) + \frac{1}{2}e^{-j\frac{\pi}{2}}\bar{Q}(j\omega + j\omega_c), \quad (20)$$

only comprises the spectrum of the Q data rail.

Figure 2:
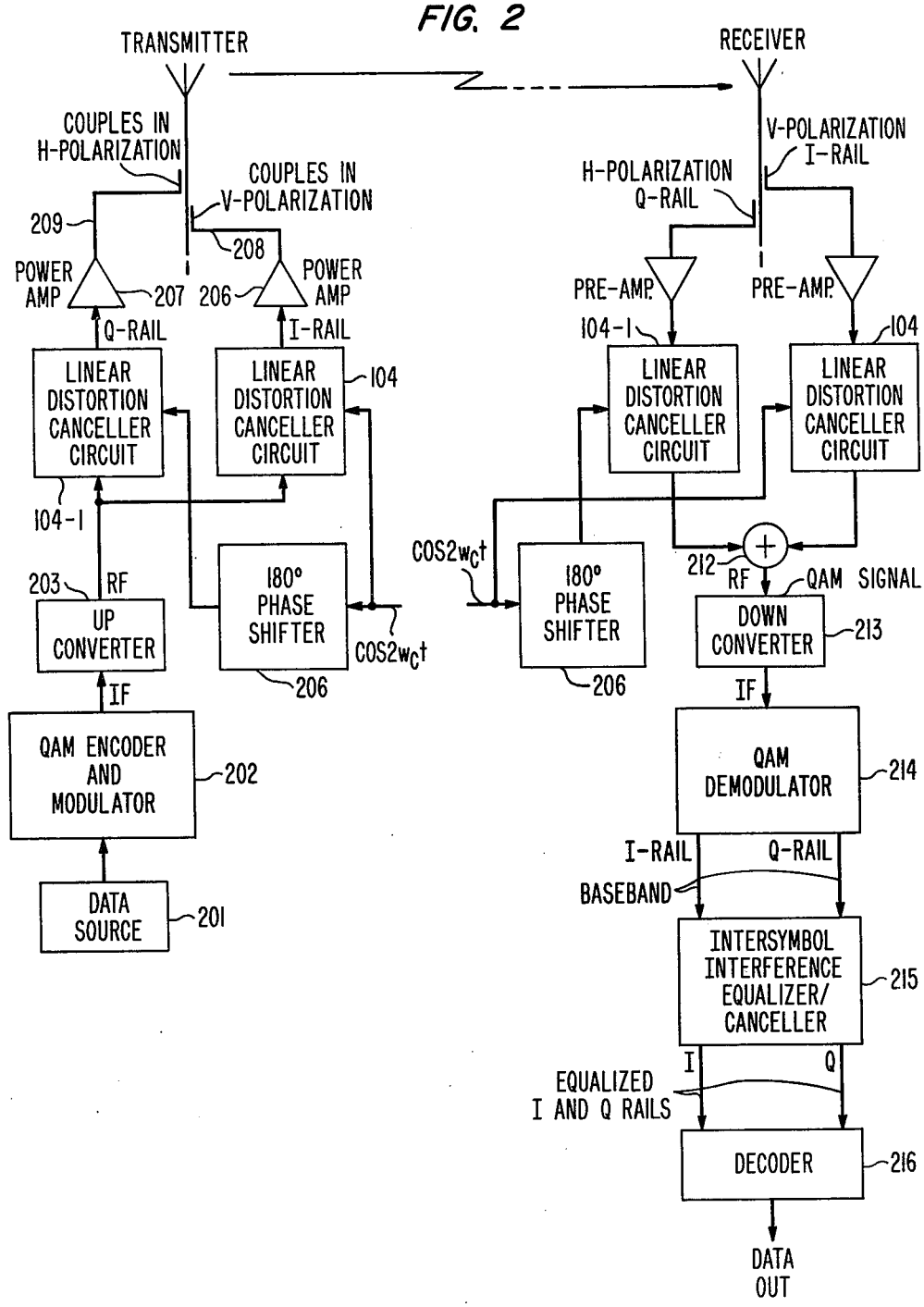
FIG. 2 is a block diagram of a second transmission system incorporating apparatus in accordance with the present invention.

Refer now to FIG. 2 which shows an application of the present invention within a communications system utilizing QAM modulation. For the purpose of illustration, the use of a linear distortion canceller in accordance with the present invention to resolve the normally transmitted QAM signal into the quadrature-related component carrier signals is shown. It is understood, of course, that this function may not be necessary if the summing operation in the QAM modulator can be conveniently deleted. Additionally, the use of conventional signal splitters at nodes dividing an RF signal is understood.

As in a conventional transmitter, digital data from source 201 is coupled to QAM encoder and modulator 202 wherein the digital data is divided into the I and Q data rails. These data rails each modulate the amplitude of a different one of two quadrature-related carriers at a predetermined IF frequency. The pair of modulated carriers are added and the resultant is frequency shifted to RF by up-converter 203. Linear distortion cancellers 104 and 104-1 resolve the output of up-converter 203 into its orthogonal components.

Canceller circuits 104 and 104-1 are identical in structure and operation to canceller circuit 104 of FIG. 1 except for a modification of the mixing signal. Note that the mixer of canceller 104 is supplied a mixing signal of cos $2\omega_c t$ while canceller 104-1 is supplied with a mixing signal of $-\cos 2\omega_c t$ via phase shifter 206. As a result, canceller 104 passes only the carrier signal amplitude modulated by the I data rail and canceller 104-1 passes only the carrier signal amplitude modulated by the Q data rail. The outputs of cancellers 104 and 104-1 respectively feed power amplifiers 206 and 207 whose outputs are coupled to the transmitting antenna via polarizing waveguides 208 and 209. To minimize signal interference, the signals coupled by waveguides 208 and 209 have polarizations which are orthogonal, e.g., horizontal (H) and vertical (V).

After passing through a linear dispersive channel, the vertically polarized I rail and horizontally polarized Q rail are coupled through preamplifiers to a pair of canceller circuits 104 and 104-1. The canceller circuits, respectively supplied with a mixing signal of cos $2\omega_c t$ and $-\cos 2\omega_c t$ (the latter via phase shifter 206), are identical in structure and operation to those used in the transmitter of FIG. 2. Hence, at the outputs of the pair of canceller circuits, the linear component of amplitude and group-delay distortion in each of the transmitted carrier signals is eliminated without degrading the signal-to-noise ratio. The outputs of the cancellers are then added by summer 212 and supplied to conventional receiver circuitry comprising down converter 213 and QAM demodulator 214. The output of demodulator 214 comprises pulse amplitude modulated pulses which are preferably coupled through an intersymbol interference equalizer/canceller 215 to improve signal quality. Finally, the equalized I and Q pulses are fed to decoder 216 which regenerates the originally supplied digital data.

It is to be understood of course that the disclosed embodiment of the present invention is merely illustrative of numerous other arrangements which may constitute applications of the principles of the present invention. Such other arrangements and modifications may readily be devised by those skilled in the art without departing from the spirit and scope of the invention. For example, while the linear distortion canceller circuit is shown operating on RF signals, the circuit can be used in the IF portion of a transmitter or receiver. Finally, while the present invention is described in reference to a radio communications system, it is to be understood that the present invention is applicable to any communications system wherein the transmission channel is linear in the time domain.

What is claimed is:

1. Apparatus for cancelling the linear distortion in a double-sideband, amplitude modulated carrier signal comprising nonzero spectral components in a frequency interval, said apparatus comprising means for splitting said carrier signal into first and second signals each comprising nonzero spectral components in said frequency interval, means for multiplying said first signal with a mixing signal at twice the carrier signal frequency to form a product signal comprising nonzero spectral components in said interval, and means for combining the nonzero spectral components of said product signal and said second signal in said frequency interval.

2. The apparatus of claim 1 wherein said first and second signals have equal amplitudes.

3. The apparatus of claim 1 wherein said combining means linearly adds the product of said first signal and said mixing signal with said second signal.

4. A method of cancelling the linear distortion in a double-sideband, amplitude modulated carrier signal comprising nonzero spectral components in a frequency interval, said method comprising the steps of splitting said carrier signal into first and second signals each comprising nonzero spectral components in said frequency interval, multiplying said first signal with a mixing signal at twice the carrier signal frequency to form a product signal comprising nonzero spectral components in said frequency interval, and combining the nonzero spectral components of said product signal and second signal in said frequency interval.

5. Apparatus for separating a QAM carrier signal comprising nonzero spectral components in a frequency interval into quadrature-related component signals, said apparatus comprising means for splitting said QAM signal into first, second, third and fourth signals each comprising nonzero spectral components in said interval, means for multiplying said first signal with a first mixing signal at twice the QAM carrier frequency to form altered nonzero spectral components in said interval, and means for combining the altered nonzero spectral components with the nonzero spectral components of said second signal.

6. The apparatus of claim 5 further comprising second means for multiplying said third signal by a second mixing signal at twice the QAM carrier frequency and having a nonzero phase angle relative to said first mixing signal.

7. The apparatus of claim 6 further comprising second means for combining the product formed by said second multiplying means and said fourth signal.

8. The apparatus of claim 5 wherein said first, second, third and fourth signals have equal amplitudes.

9. The apparatus of claim 7 wherein said combining means and second combining means each perform linear addition.

10. A receiver for use in a communications system wherein a pair of amplitude modulated, quadrature-related carriers is transmitted with different spatial polarizations and wherein each of said carriers comprises nonzero spectral components in a given frequency interval, said receiver comprising means for splitting each of said carriers into first and second signals, each of said first and second signals comprising nonzero spectral components in said interval, means for multiplying each of said first signals by a mixing signal at twice the frequency of said carriers to form product signals, each of said product signals comprising nonzero spectral components in said interval, and means for combining the nonzero spectral components of one of said product signals with the nonzero spectral components of one of said second signals.

11. The apparatus of claim 10 wherein said combining means combines the nonzero spectral components of each of said product signals with the nonzero spectral components of a different one of said second signals.

12. A method of separating a QAM carrier signal comprising nonzero spectral components in a frequency interval into quadrature-related component signals, said method comprising the steps of splitting said QAM signals into first, second, third and fourth signals each comprising nonzero spectral components in said interval, means for multiplying said first and second signals by an associated mixing signal at twice said QAM carrier frequency to form first and second product signals each comprising nonzero spectral components in said interval, and means for combining the nonzero spectral components of said first product signal and said third signal and combining the nonzero spectral components of said second product signal and said fourth signal.

* * * * *